United States Patent [19]
Brown

[11] Patent Number: 4,735,432
[45] Date of Patent: Apr. 5, 1988

[54] ARTICULATED VEHICLE

[75] Inventor: David P. Brown, Cleveland, Great Britain

[73] Assignee: Multidrive Limited, Durham, England

[21] Appl. No.: 878,285

[22] PCT Filed: Sep. 4, 1985

[86] PCT No.: PCT/GB85/00395
§ 371 Date: May 2, 1986
§ 102(e) Date: May 2, 1986

[87] PCT Pub. No.: WO86/01479
PCT Pub. Date: Mar. 13, 1986

[30] Foreign Application Priority Data
Sep. 4, 1984 [GB] United Kingdom ............... 8422302

[51] Int. Cl.$^4$ ............ B60K 17/30; B62D 13/00; B62D 53/00
[52] U.S. Cl. .................... 280/404; 180/14.1; 180/14.4; 280/426
[58] Field of Search ........... 280/400, 404, 408, 482, 280/142, 426, 100, 442; 180/14.1, 14.4, 23, 24.01, 139, 235, 241, 79.4

[56] References Cited
U.S. PATENT DOCUMENTS

| 2,384,092 | 9/1945 | Hollos | 280/426 X |
|---|---|---|---|
| 2,391,971 | 1/1946 | Hollos | 180/14.1 |
| 3,035,654 | 5/1962 | Nuttall, Jr. et al. | 180/14.4 |
| 3,454,123 | 7/1969 | Lewis | 180/23 |
| 3,845,832 | 11/1974 | Glover | 180/14.1 |
| 4,117,901 | 10/1978 | Mustered | 180/23 |
| 4,226,436 | 10/1980 | Donaldson | 280/404 |

FOREIGN PATENT DOCUMENTS

| 857685 | 12/1970 | Canada | 180/14.1 |
|---|---|---|---|
| 32957 | 3/1924 | Denmark | 280/404 |
| 2518950 | 7/1983 | France | 180/14.1 |
| 8601479 | 3/1986 | PCT Int'l Appl. | 280/404 |
| 352244 | 3/1961 | Switzerland | 180/14.1 |
| 869203 | 5/1961 | United Kingdom | 180/14.1 |

Primary Examiner—John J. Love
Assistant Examiner—Mitchell J. Hill
Attorney, Agent, or Firm—Holman & Stern

[57] ABSTRACT

The vehicle has a main chassis (2) pivotally supported by front and rear sub-chassis (1,6), one of which carries the engine. Constant velocity power is communicated between the two sub-chassis (1,6) by an intermediate shaft (20) connected to front and rear shafts (18,21) extending along the center-lines (1',6') of the respective sub-chassis (1,6). For steering, pivoting of the rear sub-chassis (6) is controlled in dependence of the pivoting of the front sub-chassis (1) so that, during, turning, the center-lines (1',6') of the sub-chassis intersect at a point (61) nearer to the pivot axis (27) of the front sub-chassis (1) than to the pivot axis (30) of the rear sub-chassis (6). The universal joints (20a,20b) of the intermediate shaft (20) are equidistant from the intersection point (61). The rear sub-chassis (6) thus pivots through a smaller angle than the front sub-chassis (1).

13 Claims, 2 Drawing Sheets

ARTICULATED VEHICLE

CROSS REFERENCE TO RELATED APPLICATION(S)

This United States application stems from PCT International Application No. PCT/GB85/00395 filed Sept. 4, 1985.

This invention is related to published European Patent Application No. EP-A2-0112712, which is the equivalent of copending U.S. patent application Ser. No. 542,999, filed Oct. 18, 1983, now U.S. Pat. No. 4,586,578, assigned to the same assignee.

BACKGROUND OF THE INVENTION

1. Field of the Invention

This invention relates to an articulated vehicle of the type wherein a trailing unit is pivotally supported by a tractor leading unit at the front and a sub-chassis at the rear.

2. Description of the Prior Art

The articulated vehicle described in the related U.S. Pat. No. 4,587,578 comprises:

a front sub-chassis and a rear sub-chassis having at least one drive axle;

a main chassis pivotally supported by each sub-chassis;

an engine mounted on one of the sub-chassis;

a mechanism for communicating constant velocity power between the sub-chassis, the mechanism comprising an intermediate shaft which extends substantially along the centerline of the main chassis when the centerlines of the sub-chassis and the main chassis are aligned, the ends of the intermediate shaft being provided with universal joints connected respectively to a front shaft extending substantially along the centerline of the front sub-chassis and a rear shaft extending substantially along the centerline of the rear sub-chassis;

steering means for causing the front sub-chassis to pivot relative to the main chassis; and control means for controlling pivoting of the rear sub-chassis relative to the main chassis in dependence on the pivoting of the front sub-chassis.

In the vehicle described in U.S. Pat. No. 4,586,578 the universal joints are substantially equidistant from the respective pivot axes of the sub-chassis and pivoting of the two sub-chassis in relation to the main chassis is controlled in such a manner that, during turning, the angle between the centerlines of the two sub-chassis and the centerline of the main chassis are equal and opposite, thereby ensuring trouble-free functioning of the shaft arrangement so that constant velocity power is communicated between the sub-chassis.

The design of the vehicle described in the above mentioned U.S. Patent brings a number of advantages, which are described in that application. However, since the control of the pivoting of the rear sub-chassis is derived from the steering of the front sub-chassis, there is a problem in ensuring that the control means has sufficient power to turn the rear sub-chassis and in particular to return it to straight-ahead travel after turning of the vehicle; in particular, there are difficulties in complying with the normal requirement that, if the steering wheel is released during turning, the vehicle should either continue turning on the same radius or straighten up. What is therefore desired is a vehicle of the above mentioned type which overcomes this problem without sacrificing the advantages of the vehicle described in the earlier European Patent Application.

Furthermore, we have now found that in some circumstances it is desirable to allow a trailer (main chassis) to cut in to a limited extent during turning, this having the advantage of extending the practical overhang behind the rear wheels (rear sub-chassis)

Accordingly, in the present invention the control means controls pivoting of the rear sub-chassis in such a manner that, during turning, the centerline of the two sub-chassis intersect each other at a point whose locus is nearer to the pivot axis of the front sub-chassis than to the pivot axis of the rear sub-chassis, and the universal joints of the intermediate shaft are positioned such that they are equidistant from the said point of intersection.

This arrangement ensures that, although the intermediate shaft does not remain parallel with the centerline of the main chassis during turning, the angle between the front shaft and the intermediate shaft is always equal and opposite to the angle between the rear shaft and the intermediate shaft, thereby ensuring trouble-free functioning of the shaft arrangement so that constant velocity power is communicated between the sub-chassis. An important advantage is that, since the locus of the point of intersection of the front sub-chassis centerline and the rear sub-chassis centre-line is nearer to the front pivot axis than to the rear pivot axis, the angle between the rear sub-chassis centerline and the main chassis centerline, during turning, is less than the angle between the front sub-chassis centerline and the main chassis centreline; consequently, the power required to pivot the rear sub-chassis is reduced in relation to that required to pivot the front sub-chassis.

Any convenient control means may be used for controlling the pivoting of the rear sub-chassis, whether mechanical means, hydraulic means, electrical means, or a combination of means. In particular, any of the means described in the Patent referred to above may be used.

BRIEF DESCRIPTION OF THE DRAWINGS

The invention will be described further with reference to the accompanying drawing, wherein.

DETAILED DESCRIPTION

The vehicles illustrated are of the type described in the related U.S. Pat. No. 4,586,578 referred to above, to which the reader is referred for the details of construction, which are not described below.

Figure 1:
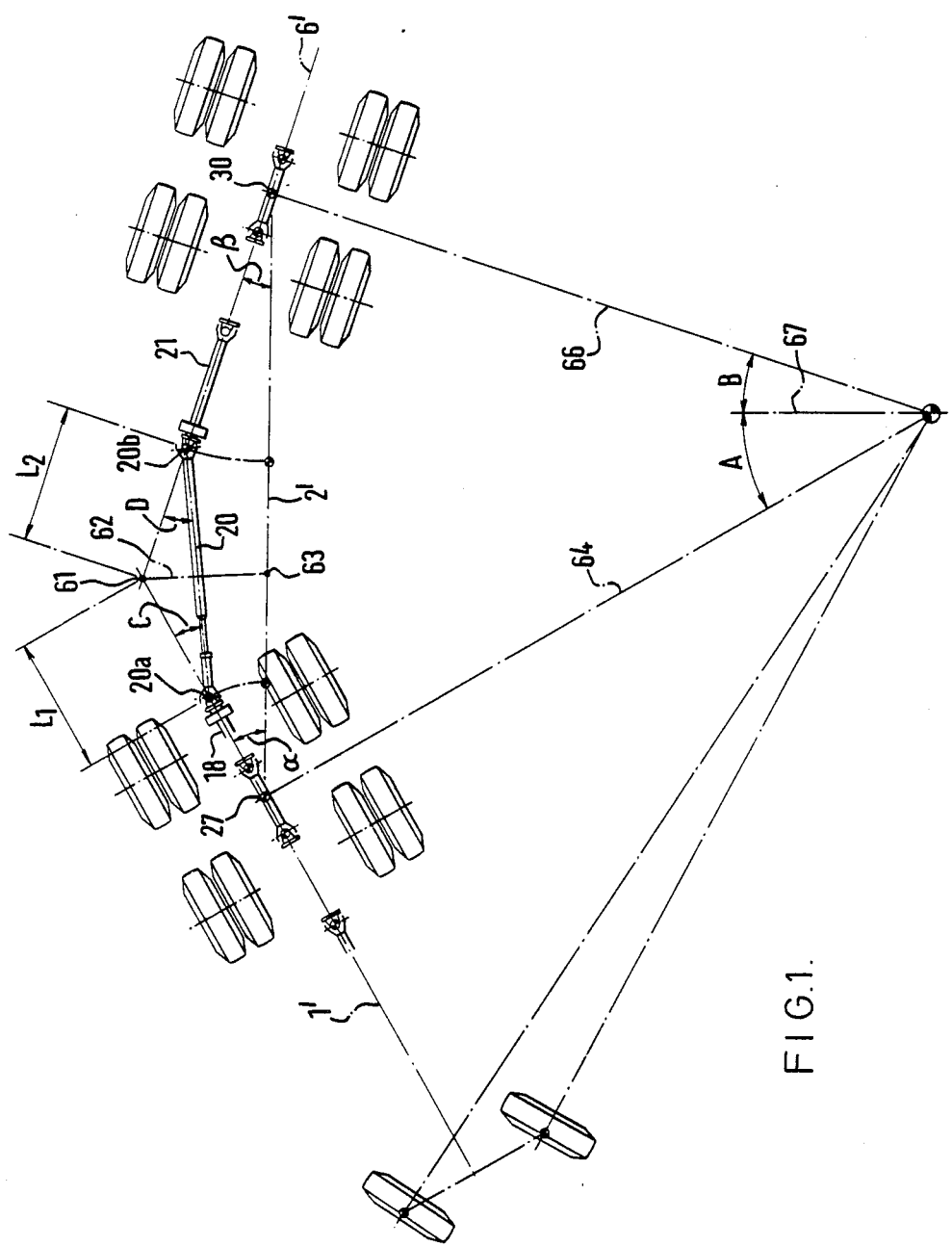
FIG. 1 is a schematic plan view of the propeller shafts and wheels of an articulated vehicle in accordance with the invention.

The vehicle illustrated in FIG. 1 comprises a standard or special highway tractor or leading unit with three axles, the rear two of which are driven. A trailing unit or trailer with two driven axles can rotate about a so-called fifth wheel coupling comprising a transverse pivot and a turntable mounted on the chassis of the tractor, constituting a front first sub-chassis having a centerline 1'. The trailer chassis constitutes the main chassis of the vehicle and has a centerline 2'. Attached to the rear of the trailer chassis is a turntable whose lower section is attached to a rear second sub-chassis 6 which carries the trailer axles and which has a centerline 6'.

As the tractor steers to left or right of the trailer via its front steering axles so that the tractor sub-chassis centerline 1' rotates through a given angle α in relation to the main chassis centerline 2' about the pivot axes 27 of the front turntable, the trailer sub-chassis centerline 6' is rotated about the pivot axes 30 of the rear turntable to an opposite but smaller angle β in relation to the main chassis centre-line 2' by suitable control means. Such control means can comprise tension rods connecting the front and rear sub-chassis or telescopic members mounted parallel to the respective centerlines 1' and 6' and pivoted to a bearing which slides on a transverse guide member, as described in the above-mentioned U.S. Pat. No. 4,586,578.

The engine and transmission are mounted on the front sub-chassis and are connected both to the tractor drive axles and the trailer drive axles. Cardan shafts are arranged so as to impart constant velocity into the trailer axles at any degree of turn, as described below.

During turning, the sub-chassis centerlines 1' and 6' intersect at a point 61 whose locus 62 crosses to the main chassis centerline 2' at a point 63. The ratio between the distance from the point 63 to the axis 27 and the distance between the point 63 and the axis 30 is approximately 0.6. The locus 62 is a circular arc of large radius and can, in practical terms, be approximated to a straight line.

A front Cardan shaft 18 extending along the front sub-chassis centerline 1' is connected to an intermediate Cardan shaft 20 which is, in turn, connected to a rear Cardan shaft 21 extending along the rear sub-chassis centerline 6'. The distance $L_1$ between the front Hookes joint 20a of the intermediate shaft 20 and the point of intersection 61 of the sub-chassis axes 1' and 6' is arranged to be equal to the distance $L_2$ between its rear Hookes joint 20b and the said point of intersection 61. From this it follows that the angles C and D between the axis of the shaft 20 and the respective axes of the shafts 28 and 21 are equal.

In the drawing, the lines 64 and 66 are perpendicular to the respective centerlines 1' and 6', and the line 67 is perpendicular to the centerline 2'. A and B represent the angles between the line 67 and the lines 64 and 66 respectively. Accordingly;

$$C+D=\alpha+\beta=A+B.$$

The distance between the Hookes joints 20a and 20b when the centerlines 1', 2', and 6' are aligned is made large enough to allow sufficient telescoping of the intermediate shaft 20 to enable it to lengthen during steering from the central to the maximum steering angle.

In the case in which the control means comprises a transverse guide member, as described above, this member will be arranged directly above the locus 62. As described in the above-mentioned U.S. Pat. No. 4,586,578, the control means may be assisted by a hydraulic ram.

Figure 2:
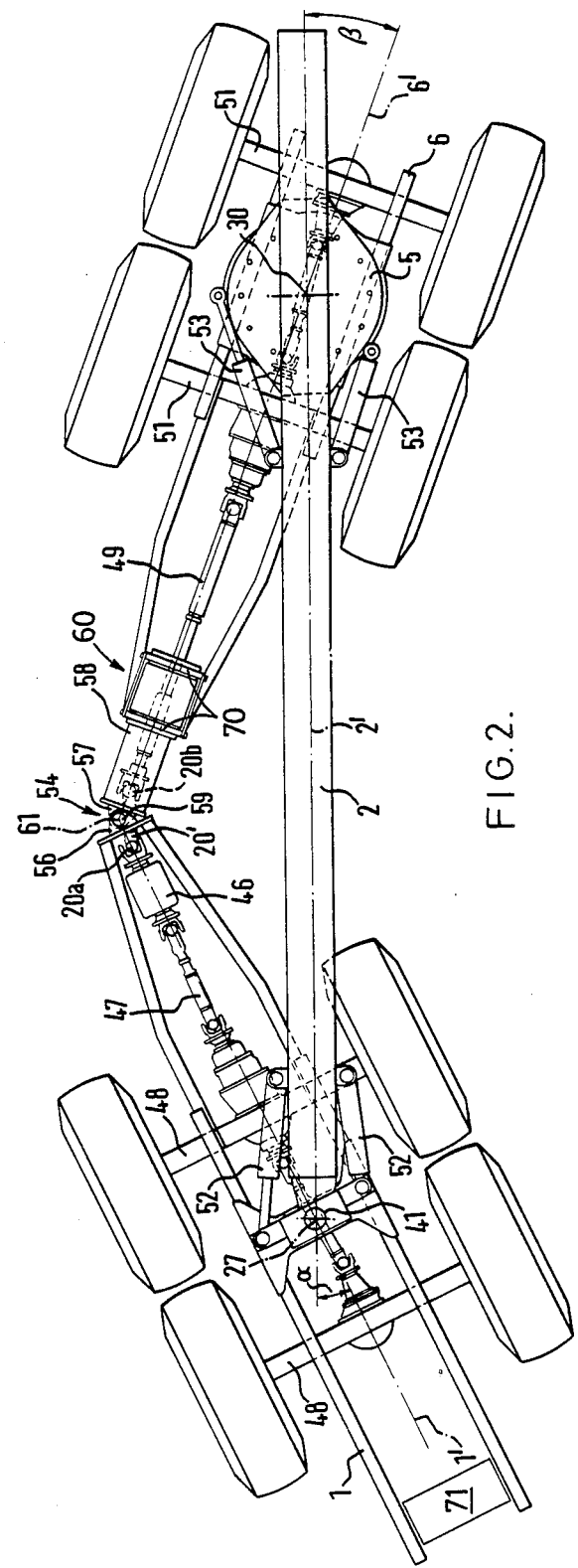
FIG. 2 is a similar view of another vehicle in accordance with the invention.

In the articulated vehicle illustrated in FIG. 2 the tractor sub-chassis 1, on which an engine shown schematically at 71 is supported, is connected to the main chassis 2 by a pivot 41, defining the pivot axis 27. The rear sub-chassis 6 carries the main chassis 2 by way of a turntable 5, defining the pivot axis 30.

The engine transmission (not shown) is connected to a transfer box 46 whose output shaft (extending along the front sub-chassis centerline 1') drives, on the one hand, the intermediate shaft 20' and, on the other hand, a Cardan shaft 47 from which drive is transmitted at constant velocity to each of the two front drive axles 48. The shaft 20 is connected to a rear Cardan shaft 49 mounted on the rear sub-chassis 6, from which drive is transmitted at constant velocity to the two rear drive axles 51.

Steering is obtained by turning the whole of the tractor about the axis 27 by means of hydraulic rams 52 acting between the sub-chassis 1 and the main-chassis 2, and at the same time turning the rear sub-chassis 6 through a smaller, opposite angle by means of hydraulic rams 53 between it and the main chassis 2. In the position shown, the angle α between the axes 1' and 2' is 25° and the angle β between the axes 6' and 2' is 20°. The relative pivoting of the sub-chassis 1, 6 is controlled with the aid of a pivotal connection 54 between them, comprising a bracket 56 rigidly fixed on the sub-chassis 1 and a bracket 57 rigidly fixed on an axially slidable member 58 mounted on the sub-chassis 6. More particularly, a bearing support structure 60 is mounted near the front end of the sub-chassis 6 and has rollers 70 rotatably mounted thereon. Member 58 engages rollers 70 which allow member 58 to slide axially in the bearing support structure 60. The brackets 56, 57 are connected by a vertical pivot pin 59 whose pivot axis 61 coincides with the point of intersection of the centerlines 1', 6'.

It will be noted that the locus of the axis 61 during turning is an arc of a circle centered on the axis 27 and is nearer to the axis 27 than to the axis 30. In the embodiment illustrated the locus also crosses 61 the centerline 2' at a point which is nearer the axis 27 than the axis 30; it may, however, be permissible in some circumstances for this point to be half-way between the axes 27, 30.

In this embodiment it is the shaft 49 which telescopes during turning, being made sufficiently long for this purpose, while the length of the intermediate shaft 20 remains substantially unchanged (e.g. a change of about 30 mm), with its Hookes joints 20a, 20b equidistant from the axis 61.

Various modifications may be made within the scope of the invention, as described in the above-mentioned U.S. Pat. No. 4,586,578.

I claim:

1. In an articulated vehicle including a front sub-chassis and a rear sub-chassis each having a respective front and rear pivot axis and at least one drive axle, a main chassis pivotally supported by each sub-chassis for relative pivotal movement about the respective pivot axes, a mechanism for communicating constant velocity power between the sub-chassis having an intermediate shaft which extends substantially along the centerline of the main chassis when the centerlines of the sub-chassis and the main chassis are aligned, universal joints on the ends of the intermediate shaft connected respectively to a front shaft extending substantially along the centerline of the front sub-chassis and a rear shaft extending substantially along the centerline of the rear sub-chassis, steering means for causing the front sub-chassis to pivot relative to the main chassis, and control means for controlling the pivoting of the rear sub-chassis relative to the main chassis in response to the pivoting of the front sub-chassis, the improvement in the control means comprising:

menas for controlling pivoting of the rear sub-chassis so that, during turning, the centerlines of the front and rear sub-chassis intersect each other at a point whose locus of travel is nearer to the front pivot axis of the front sub-chassis than to the rear pivot axis of the rear sub-chassis, and the universal joints of the intermediate shaft are positioned equidistant from said point of intersection.

2. The improvement as claimed in claim 1 wherein said control means further comprises:
   an axially movable member mounted on the rear sub-chassis; and
   a pivotal connection between the front sub-chassis and said axially movable member.

3. The improvement as claimed in claim 2 wherein said steering means comprises:
   at least one hydraulic ram acting between the front sub-chassis and the main chassis and at least one hydraulic ram acting between the rear sub-chassis and the main chassis.

4. The improvement as claimed in claim 3 wherein said axially movable member comprises:
   a bearing structure mounted on the rear sub-chassis; and
   a slidable member engaging said bearing structure for axial sliding movement with respect thereto.

5. The improvement as claimed in claim 4 wherein:
   said bearing structure comprises a plurality of rollers; and
   said pivotal connection comprises a first bracket rigidly mounted on the rear end of the front sub-chassis, a second bracket mounted on said slidable member, and a pivot pin connecting said brackets together.

6. The improvement as claimed in claim 5 wherein said steering means comprises:
   two front hydraulic rams each having opposite ends and each connected at one end thereof to one side of the main chassis and at the other end thereof to the front sub-chassis.

7. The improvement as claimed in claim 6 wherein said steering means further comprises:
   two rear hydraulic rams each having opposite ends and each connected at one end thereof to one side of the main chassis and at the other end thereof to the rear sub-chassis.

8. The improvement as claimed in claim 2 wherein said axially movable member comprises:
   a bearing structure mounted on the rear sub-chassis; and
   a slidable member engaging said bearing structure for axial sliding movement with respect thereto.

9. The improvement as claimed in claim 8 wherein:
   said bearing structure comprises a plurality of rollers; and
   said pivotal connection comprises a first bracket rigidly mounted on the rear end of the front sub-chassis, a second bracket mounted on said slidable member, and a pivot pin connecting said brackets together.

10. The improvement as claimed in claim 1 wherein:
    said locus crosses the centerline of the main chassis nearer to the front pivot axis of the front sub-chassis than to the rear pivot axis of the rear sub-chassis.

11. The improvement as claimed in claim 1 wherein said steering means comprises:
    at least one hydraulic ram acting between the front sub-chassis and the main chassis and at least one hydraulic ram acting between the rear sub-chassis and the main chassis.

12. The improvement as claimed in claim 11 wherein said steering means comprises:
    two front hydraulic rams each having opposite ends and each connected at one end thereof to one side of the main chassis and at the other end thereof to the front sub-chassis.

13. The improvement as claimed in claim 12 wherein said steering means further comprises:
    two rear hydraulic rams each having opposite ends and each connected at one end thereof to one side of the main chassis and at the other end thereof to the rear sub-chassis.

* * * * *